Patented May 16, 1944

2,349,138

UNITED STATES PATENT OFFICE 2,349,138

PREPARATION OF PECTIC ACID

Edwin F. Bryant, Corona, Calif., assignor to California Fruit Growers Exchange, Los Angeles, Calif., a corporation of California No Drawing. Application March 1, 1941, Serial No. 381,409

7 Claims. (Cl. 260—209.5)

This invention relates to the preparation of pectic acid, and it is more particularly concerned with preparing this material by a method that is not only susceptible of commercial use, but is indeed well adapted to manufacturing plant or factory operation.

A broad object of my invention is to provide a new and improved method for producing pectic acid.

A particular object is to provide a method for the manufacture of pectic acid which may be economically used on a commercial scale, as distinguished from prior methods, many of which have been impracticable outside the laboratory.

Another object is to provide a method for producing pectic acid in a high degree of purity and at yields not possible with present processes.

Other objects, uses, and advantages of my invention and of the process which it envisions will in part be specifically referred to hereinafter, and will be fully apparent and evident to those skilled in this art, both from a consideration of the disclosure herein and from utilization of the process.

In the development of knowledge concerning pectic materials, a great deal of confusion has been prevalent. Different investigators in the field have assigned the same term to materials having widely differing properties, and on the other hand they have employed widely differing terms for materials that have subsequently been shown to be substantially identical. The exact nature and configuration of the pectin molecule is probably not known today. It is, however, generally considered that the plant source material is a substance called protopectin, which is insoluble in water. As the plant material goes through the normal maturation or ripening process, the protopectin is changed into pectin, which is water soluble. A similar and probably identical transformation of the protopectin (or a portion thereof) into a water soluble form can be accomplished by means of certain chemical treatments which are now well known. While it has, until lately, been considered practically worthless, pectic acid is now of importance in the synthesis of ascorbic acid, and in the manufacture of certain alkaloid insecticides, as, for example, those disclosed in Patents Nos. 2,207,694 and 2,207,185.

In general, I use for a starting material in my process for the preparation of pectic acid a substance produced in common processes for the manufacture of pectin, wherein pectin is extracted from plant tissues by the action of warm acid solution and precipitated from the extract by the action of a metal compound. This precipitated substance is not itself pectin, as is evidenced by its incapability of producing a gel, but it is an intermediate product which must be further treated in order for pectin to be recovered. The composition of this precipitated substance is not fully and definitely known. There is some question as to whether or not it is actually a combination between the metal or metal compound and pectin. I will refer to the substance herein as a pectin-metal composition.

Examples of a composition such as that just discussed are the precipitate formed by action of aluminum hydroxide, as in the process of Patent No. 1,497,884, and the so-called metallic pectinate of Patent No. 2,163,620. To produce pectin from this sort of precipitated material, it is generally washed with acid and alcohol, dried, and ground, with various modifications. These various procedural steps necessary to the preparation of a substance regarded as pure pectin obviously are responsible for a production cost for pectin much greater than that for the intermediate composition.

The pectin-metal composition which I have thus at length described, and which has been used heretofore for the preparation of pectin, I treat first with an alkali, and then with an acid, at all times avoiding hydration, and in this manner prepare pectic acid.

For a specific example to clearly illustrate the method employed, I start with 2000 kg. of the pectin-metal composition produced by precipitating pectin from an acid extract of citrus peel by the action of aluminum hydroxide. This precipitated material will represent approximately 220 kg. pectin, and will contain about 85% water. The precipitate made as prepared in at least one commercial operation of this precipitation process is in the form of a curd which is very slightly gummy and somewhat rubbery, strongly resembling in consistency ordinary commercial art gum. The composition is first ground to such fineness that all will pass a 10 mesh screen. The ground material is then added to about 3100 liters of 50% isopropyl alcohol containing 62 kg. of sodium hydroxide in solution, and stirred occasionally for about 15 minutes, while remaining at room temperature.

This treatment results in the elimination apparently of the pectin-metal composition and transformation of the pectin thereof without solution of the pectin in the treating liquid. The treatment gives a crude sodium pectate, which is filtered to remove excess liquid, and washed, first with water and then with 50% isopropyl alcohol, to remove excess alkali and aluminum compounds. Care should be used with the water wash to prevent hydrating the pectate.

The sodium pectate, after being thus freed of most of the excess alkali and aluminum compounds, is added to 2000 liters of isopropyl alcohol containing 750 liters of commercial hydrochloric acid (about 37% HCl). This mixture may be allowed to react at room temperature for half an hour. The reaction temperature may be raised if desired. The pectic acid is then removed, washed with water, and successively with isopropyl alcohol of increasing proof, drained, and dried in a tray drier.

Two hundred kilograms of pectic acid is the yield from the process described. This pectic acid analyzes about 92 to 95% pure on the basis of anhydrogalacturonic acid, considered as having an equivalent weight of 176. The product is quite white.

Pectic acid has been produced by enzymatic action, and by alkaline hydrolysis of protopectin, the material generally found in plant tissues. It has also been prepared in the laboratory from purified pectin. Due to the gelatinous character of the pectin and intermediate materials formed, these processes involve extreme difficulty in handling steps, particularly the filtration and pressing necessary at various stages. All prior processes of which I am aware involve treatment of the pectin substance in hydrated form, and while such processes may be useful in the laboratory for the preparation of small amounts of pectic acid for special purposes, they offer practically insurmountable obstacles to commercial usage.

By my process I am able to overcome the difficulties hitherto encountered, since I substantially avoid the gelatinous form and thus greatly facilitate filtration and pressing, and I thus provide a commercially practicable manner for the efficient preparation of pectic acid.

The simplicity of the method is evident. The hydration of the pectic material, with the difficulties attendant to its handling, may be substantially avoided. Water washings are limited to periods short enough, and to quantities of water and changes of water so as to assure little or no chance for the material to swell and become gelatinous. These particular manipulations will be obvious to any skilled worker and may be acquired by any worker upon brief experience. Temperatures are not critical, room temperature throughout being suitable. A high yield, averaging about 85%, is obtained, and the pectic acid is, without further processing, of high enough purity for most uses. Certain sugars occurring as part of the pectin molecule constitute substantially all of the impurities present in the product as described above. Elimination of these may be effected by a heating step at the time of the treatment with acid, if it is thought desirable that they should be eliminated.

Pectin in association with other metals, as lead, nickel, manganese, cobalt, and zinc, or their salts, may be used as a starting material. Various substitutions may be made for the sodium hydroxide, for the isopropyl alcohol, and for the hydrochloric acid, suggested ones being ammonia, potassium hydroxide, butyl or ethyl alcohol, and sulfuric acid, respectively. Others will occur to those employing the process. Any water miscible organic solvent in which pectin and pectates are insoluble, any alkali material, including organic bases, or alkaline salt strong enough to form a pectate, and any acid strong enough to decompose the pectate that has been formed, may be utilized. Numerous changes may be made in procedure, such as drying, washing, time of treatment with the various reagents, etc.

The washing of the crude pectate with dilute alcohol and hydrochloric acid may replace the washing with water and alcohol, according to choice and to equipment available. Hydration of the pectate should be carefully avoided.

A wide variation in practice for drying the product is possible. Washing may be more or less thorough than is set forth in the specific example.

I claim:

1. The process for preparing pectic acid, comprising reacting a pectin-metal composition with ammonium hydroxide in alcoholic solution, to produce ammonium pectate, and reacting the ammonium pectate with hydrochloric acid in alcoholic solution, to form pectic acid.

2. The process for preparing pectic acid, comprising reacting a pectin-aluminum composition with sodium hydoxide in isopropyl alcohol to form sodium pectate, and reacting said sodium pectate with hydrochloric acid in isopropyl alcohol to form pectic acid.

3. The process for preparing pectic acid, comprising reacting a pectin-aluminum composition with sodium hydroxide in ethyl alcohol to form soduim pectate, and reacting said sodium pectate with hydrochloric acid in ethyl alcohol to form pectic acid.

4. The process for preparing pectic acid, comprising reacting a pectin-metal composition with sodium hydroxide in alcoholic solution, to produce sodium pectate, and reacting the sodium pectate with hydrochloric acid in alcoholic solution, to form pectic acid.

5. A process for the preparation of pectic acid comprising first reacting a pectin-metal composition with a basic substance capable of forming a pectate by reaction with the pectin-metal composition in alcoholic solution, whereby a pectate is formed and then reacting said pectate with an acid in alcoholic solution whereby pectic acid is formed.

6. The process for preparation of pectic acid comprising reacting a pectin-metal composition with sodium hydroxide in alcoholic solution to produce sodium pectate and reacting the sodium pectate with an acid in alccholic solution to form pectic acid.

7. A process for the preparation of pectic acid from a pectin-metal composition comprising first reacting the said pectin-metal composition in substantially non-hydrated form with a basic substance to convert the said pectin-metal composition to a substantially non-hydrated pectate and then reacting said pectate with an acid to form substantially non-hydrated pectic acid.

EDWIN F. BRYANT.